July 20, 1965 C. F. MIDDLETON, JR 3,195,600
CAPTIVE SCREW DEVICES
Filed July 29, 1963

INVENTOR.
CHARLES F. MIDDLETON, JR.
BY Leo R. Reynolds
AGENT

United States Patent Office 3,195,600
Patented July 20, 1965

3,195,600
CAPTIVE SCREW DEVICES
Charles F. Middleton, Jr., Marlboro, Mass., assignor to Raytheon Company, Lexington, Mass., a corporation of Delaware
Filed July 29, 1963, Ser. No. 298,275
1 Claim. (Cl. 151—69)

This invention pertains generally to threaded fastener devices, and more particularly to captive screw devices.

Captive screw devices are well known in the threaded fastener art, and in their usual form they include a screw member having a head and a threaded shaft portion separated by a shank the diameter of which is somewhat less than the major diameter of the screw thread. The retainer in which the screw is to be held usually consists of some form of support disc or the like having a screw threaded opening therein through which the screw is threaded and then held in captive relationship free for rotation relative to the retainer. That is to say, with only a portion of the screw shaft being threaded, as the screw is threaded through the support aperture past the engagement of the shaft thread with the cooperating aperture thread, the screw is then held loosely in the aperture at the relatively slender shank portion, with the screw head and the threaded portion defining limits for the unimpeded axial travel of the screw relative to the retainer.

In the general area of endeavor involving sheet metal fabrication and the like, there is a persistent design problem relating to the matter of tolerances. When a given device or structure is designed, the working drawings from which the fabrication proceeds invariably indicate the mechanical tolerances which are allowed by the designer. The machinist, for example, then knows to within what dimensional accuracy he must cut a workpiece or place a screw hole or the like therein.

As the accuracy of machine tools and the like increases, it becomes less difficult for the machinist to meet the requirements of a given design tolerance. However, many limitations still exist in the ability to stay within required tolerances, especially in view of the close tolerances demanded in many of the more advanced engineering designs of today.

One solution that has been provided to the problem of tolerances, a solution that is particularly adapted to the problem as applied to the mating of a screw held in one workpiece (such as a captive screw) with a cooperating nut or other aperture in a second workpiece, is the utilization of a connecting means having a certain amount of "play" or variable positioning ability built into the connector. A specific example is the basketed nut, wherein a limited amount of lateral movement is permitted when the nut is not tightened down on a mating screw or bolt, and such lateral movement can overcome some of the difficulties encountered in meeting the tolerances imposed on the postioning of the screw and the nut in their respective pieces. However, for many applications the basketed nut and other similar devices do not provide a complete solution. Additionally, the physical bulk of a basketed nut assembly is sometimes greater than can conveniently be permitted by the designer.

It is therefore a general object of the present invention to provide a threaded fastener device which overcomes the aforementioned limitations of the prior art devices.

A more specific object of the invention is to provide a threaded fastener device which affords a designed amount of lateral freedom of movement in a captive screw retainer device.

A further object of the present invention is to provide a threaded fastener device which affords a designed amount of lateral freedom of movement in a selected plane in a captive screw retainer device.

Still another object of the invention is to provide a threaded fastener device which affords a designed amount of lateral freedom of movement in a selectable plane in a captive screw retainer device.

In accordance with the present invention, the above and other objects are achieved by means of a novel type of retainer device for captive screws of the type having a head and a screw-threaded shaft portion separated by a shank of diameter less than the major diameter of the shaft threads. The retainer device includes a pair of support members having opposed substantially parallel surfaces spaced apart a distance greater than the diameter of the shank portion of the captive screw but less than the major diameter of the screw threads thereon, with a pair of opposed portions of the parallel surfaces having mutually cooperating screw threads thereon to form an interrupted-thread nut for engagement with the threads of the captive screw, whereby the captive screw may be threaded into captive relationship and then be loosely retained between the opposed surfaces for limited movement in a plane parallel to said surfaces. These support members may be mounted in a fixed position, or, alternatively, may be mounted for rotational movement upon an axis parallel with the axis of the interrupted-thread nut, so that the plane of limited movement of the captive screw may be oriented in a desired direction.

With the above considerations and objects in mind, the invention itself will now be described in connection with a preferred embodiment thereof given by way of example and not of limitation, and with reference to the accompanying drawings, in which.

Figure 1:
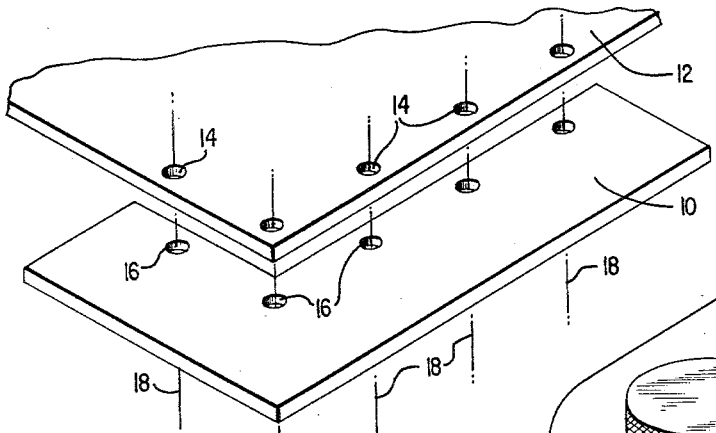
FIG. 1 is a perspective view of a pair of workpieces which are to be joined together by connecting means of the general type to which the present invention pertains.

Referring now particularly to FIG. 1, a pair of workpieces 10 and 12 which are to be interconnected are shown in partially superposed relationship indicating the relative positions in which the two pieces are to be connected. A plurality of apertures 14 are positioned along the edges of the workpiece 12, and a corresponding plurality of similarly positioned apertures 16 are present in the mating piece 10. The respective alignment of these apertures is indicated by the plurality of center lines 18.

As will be appreciated by those skilled in the art, the accuracy with which the several apertures 14 and 16 are placed in their respective workpieces must be held within the tolerances prescribed by the design engineer. As a practical matter, there are many reasons which either alone or in combination render it all but impossible to position each of the apertures 14 and 16 with absolute accuracy. As a result, it has been common practice in the prior art to provide some means of introducing a small amount of "play" or floating position in the means which are employed to interconnect a pair of workpieces such as indicated in FIG. 1. For example, each of the apertures 16 may have connected thereto a basketed nut or the like, whereby the nut or other engaging means is free for limited movement parallel to the plane of the workpiece 10, so as to permit the alignment and connection of the nut with a screw or the like extending through the corresponding aperture 14 in workpiece 12 even though the latter aperture is not precisely aligned with the aperture 16 in question. While the basketed nut and other similar devices of the prior art have proven satisfactory in some applications, they do not provide as complete a solution as might be desired, and this is especially true where space is at a premium, since the basketed nut is a relatively bulky device.

The device of the present invention provides the advantages of the devices of the prior art without incurring the disadvantages thereof. Where captive screws are to be employed, the present invention provides a device which permits a desired amount of lateral motion or "play", while avoiding the additional bulk of the basketed nut. This is accomplished in the present invention by combining the means for permitting lateral motion for alignment purposes with the device which constitutes the retainer for the captive screw.

Figure 2:
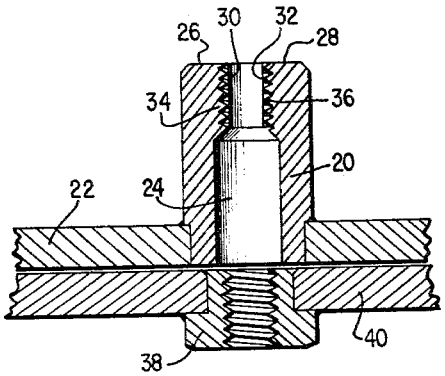
FIG. 2 is a vertical section of one preferred form of the captive screw retainer device of the present invention, shown mounted in a support plate adjacent a mating workpiece.

FIG. 2 shows one preferred form of the invention, wherein a tubular member 20 is positioned within an aperture in a support plate 22 therefor. The means for securing the tubular member 20 to the support plate 22 does not form an essential part of the present invention, but the former may be swaged, for example, to the latter.

Figure 3:
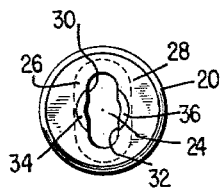
FIG. 3 is a plan view of the device illustrated in FIG. 2.

Tubular member 20 includes a hollow inner portion 24 which extends along the length thereof. Referring now to FIGS. 2 and 3 together, the top portion of the tubular support member 20 is partially closed by a pair of elements 26 and 28 which may be integral with the tubular member 20 as indicated in the drawing, or which may be individual members respectively mounted on the tubular support member 20. In either case, the elements 26 and 28 present opposed substantially parallel surfaces 30 and 32, respectively, which form therebetween an elongate slot, as may be seen in FIG. 3.

A portion of each of the walls 30 and 32 of the slot is threaded, as indicated at 34 and 36, respectively, with the threaded portions cooperating to form an interrupted-thread nut at the top of the tubular support member 20, with the axis of the nut coinciding with that of the tubular member 20.

In the use of the device of the present invention in the form shown in FIGS. 2 and 3, a captive-type screw is threaded into the upper opening in the tubular member 20 past the position of engagement of the threads 34 and 36 with the corresponding threaded portion of the captive screw. The screw is thus free for axial movement along the relatively slender shank thereof between limits defined by the threaded portion thereon and the head at the opposite end of the shank, as is the case in the captive screws of the prior art. However, the device of the present invention also permits lateral movement, whether pivotal or of translation, of a captive screw inserted therein. Thus, a screw retained within the elongate tubular member 20 of FIGS. 2 and 3 may be moved laterally (that is, in a direction perpendicular to the length of the screw) to the extent needed in order to permit the screw to be positioned in mating alignment with a suitable nut 38 or the like swaged or otherwise mounted on mating workpiece or support plate 40.

Figure 4:
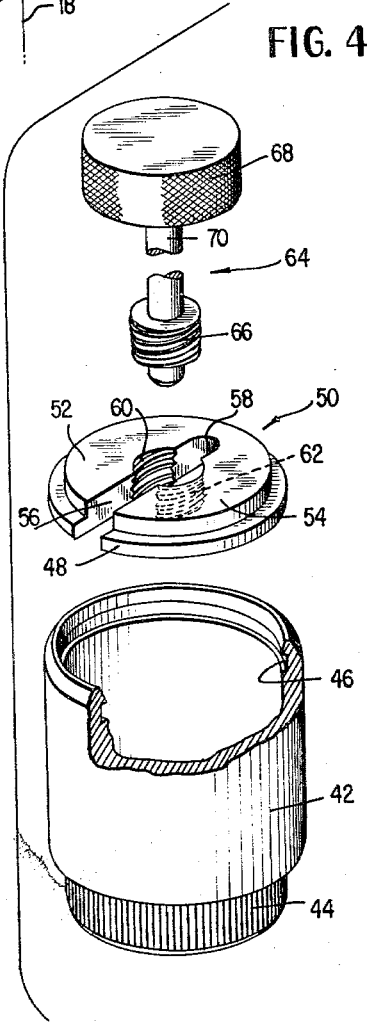
FIG. 4 is an exploded perspective view of an alternative form of the captive screw retainer assembly of the present invention.

The device illustrated in FIGS. 2 and 3 provides a ready solution to the greater percentage of tolerance problems, a solution which is economical of both cost and bulk or volume. In positioning mounting holes and the like in sheet metal fabrication, tolerance problems usually occur in only one direction in the sheet in any given application. Therefore, the device of FIGS. 2 and 3 may be mounted in the sheet with the slot in the top of the retainer device oriented in the direction of the dimension which is most difficult to control.

Where greater flexibility is desired or necessary in meeting the tolerance requirements of a given design, and especially where the tolerance problems are relatively complex or variable, it may prove advantageous to employ an alternate form of the device of the present invention, as illustrated in FIG. 4. As shown, the elongate tubular support member 42 of the retainer device has a knurled base portion 44 thereon for insertion into an aperture on a support plate or the like. The top portion of the tubular member 42 includes an internal recessed ring 46, into which a cooperating lip 48 of a separate retainer cap 50 is snapped. Obviously, the cap 50 will desirably be formed of a suitable resilient material, such as a plastic or metal.

Retainer cap 50 serves the purpose of the integral top members 26 and 28 shown in FIGS. 2 and 3, and comprises a pair of support members 52 and 54 which constitute the legs of the U-shaped retainer cap 50. As is the case with members 26 and 28 of FIGS. 2 and 3, the support members 52 and 54 in FIG. 4 may alternatively be separate elements which are both retained within the ring 46 in tubular member 42.

The support members 52 and 54 have respective opposed parallel surfaces 56 and 58, which form an elongate slot in the manner described in connection with FIGS. 2 and 3. The elongated slot comprised of surfaces 56 and 58 is extended to the periphery of the retainer cap 50 in the embodiment of FIG. 4 so as to provide sufficient flexibility of cap 50 and thereby permit the cap to be snapped into cooperating lip 48. It is to be understood that where inherently resilient materials are used for the cap 50 the extension of the slot to the periphery may be dispensed with. Opposed portions of the surfaces 56 and 58 are provided with cooperating screw threads 60 and 62, which form an interrupted-thread nut in the retainer cap 50, with the axis of the nut coinciding with that of the support 42, when assembled.

A representative captive screw 64 is illustrated in FIG. 4, including a threaded shaft portion 66, the threads of which are designed to cooperate with the threads 60 and 62 in the retainer cap member 50. The captive screw 64 also includes a knurled head 68, as well as a relatively slender shank portion 70 extending between the head 68 and the threaded shaft portion 66.

In the use of the device illustrated in FIG. 4, the screw 64 is threaded through the retainer cap 50 past the point of engagement of the screw thread 66 with the threads 60 and 62 in the retainer cap, with the screw thereupon being retained in loose relationship within the retainer cap 50. Since the diameter of the shank 70 of captive screw 64 is somewhat less than the distance between the surfaces 56 and 58 in the retainer cap 50, the screw 64 is free for lateral and pivotal movement within the slot formed by the surfaces 56 and 58, so as to permit the screw to be properly aligned with a mating nut. In view of the fact that the major diameter of the screw threads 66 on the captive screw 64 is slightly larger than the distance between the slot surfaces 56 and 58, the screw is held captive in the retainer cap 50, being free for axial movement between limits defined by the knurled head 68 and the nearer end of the screw thread 66.

The invention has been described above in some detail, and particularly with reference to its application to threaded fastener means for interconnecting a pair of sheet or plate-like members. However, it will be apparent to those skilled in the art that the invention is also applicable to captive screw applications of other configurations where tolerance problems exist. Further, the device of the invention need not necessarily take the form of an elongate tubular member, since the two support members which form the slot within which the screw is held captive may conveniently form a part of an entirely different structure. Also, as was stated above, the two support members which form the slot may be either integral or separate, as desired. Additionally, the threaded portion constituting the interrupted-thread nut may be other than centered in the support member. Hence, the invention is not to

What is claimed is:

A captive screw retainer device, comprising, in combination, a tubular member having attaching means at one end thereof adapted to be mounted in an aperture in a support plate or the like, a closure member for the opposite end of said tubular member, said closure member having an elongate slot therein transverse the length of said tubular member, with a pair of opposed portions of the side walls of said slot having mutually cooperating screw threads therein intermediate the extremities of said slot, the diameter of said screw threads being greater than the width of the remainder of said slot, a captive screw member having an enlarged head portion and a shaft the diameter of which is less than the width of said elongate slot and a portion of the length of which includes a screw thread adapted to threadedly engage said first-mentioned screw thread, and flange and groove means on the closure member and tubular member, respectively, for mounting said closure member within said tubular member for rotation in its own plane around the axis of said tubular member, whereby said captive screw may be threaded into captive relationship and then be loosely retained in said slot for limited movement in a plane parallel to the side walls of said slot.

References Cited by the Examiner
UNITED STATES PATENTS

| | | | |
|---|---|---|---|
| 525,877 | 9/94 | Wardwell. | |
| 1,719,301 | 7/29 | Metcalf | 151—69 |
| 2,120,530 | 6/38 | Shippee et al. | 151—69 |
| 2,409,516 | 10/46 | Rosenthal et al. | 151—69 |
| 2,919,736 | 1/60 | Kann | 151—69 |
| 3,059,736 | 10/62 | Boyd | 151—69 |

References Cited by the Applicant
UNITED STATES PATENTS

| | | |
|---|---|---|
| 1,925,689 | 9/33 | Dietrich. |
| 2,172,461 | 9/39 | Whitescarver. |
| 2,176,411 | 10/39 | Washer. |
| 2,196,032 | 4/40 | Schmitt. |
| 2,372,566 | 3/45 | Gazley. |
| 2,395,142 | 2/46 | Poupitch. |
| 2,972,367 | 2/61 | Wootton. |
| 3,006,003 | 10/61 | Johnson. |

EDWARD C. ALLEN, *Primary Examiner.*